March 10, 1942.   H. L. PELZER ET AL   2,275,920
CATALYTIC REACTOR
Filed March 27, 1940   2 Sheets-Sheet 1

INVENTOR
Harry L. Pelzer and
Willis S. Gullette
BY
ATTORNEYS

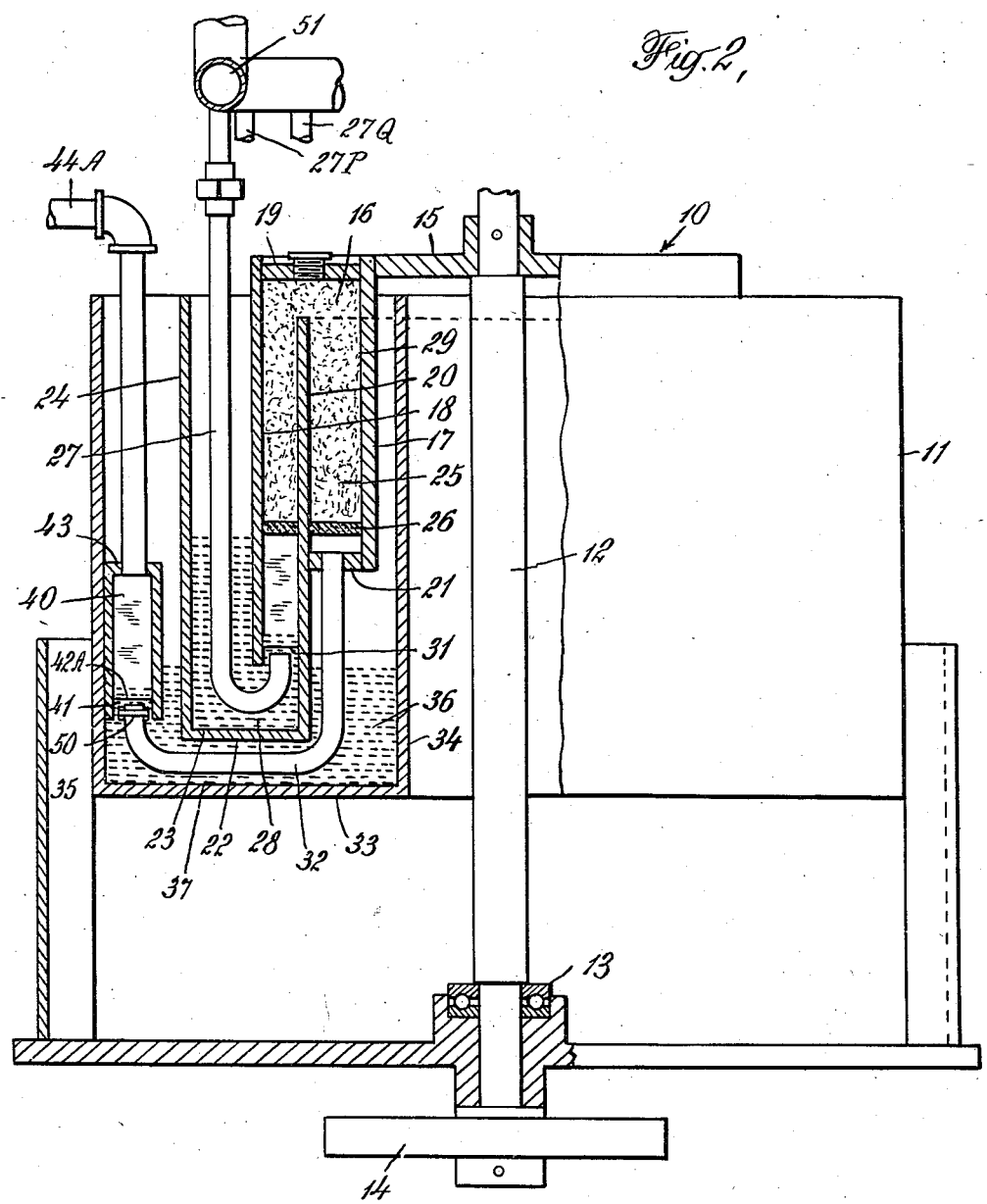

Patented Mar. 10, 1942

2,275,920

UNITED STATES PATENT OFFICE 2,275,920

CATALYTIC REACTOR

Harry L. Pelzer, Houston, Tex., and Willis S. Gullette, Highland, Ind., assignors to Sinclair Refining Company, New York, N. Y., a corporation of Maine Application March 27, 1940, Serial No. 326,198

12 Claims. (Cl. 23—288)

This invention relates to catalysis and particularly to operations in which a catalytic mass is moved from one zone to another in which different chemical conditions are maintained, as, for example, in an operation in which a catalytic mass is moved periodically from a reaction zone into a second zone in which the mass is regenerated. The invention is applied advantageously in the catalysis of hydrocarbon reactions in which the catalytic mass tends to become fouled with reaction products, as in catalytic cracking, and contemplates improvements in apparatus and methods to the end that a catalytic mass may be moved periodically between zones in which different conditions are maintained while keeping said zones positively sealed from each other.

It has been proposed heretofore to move a catalytic mass periodically from a reaction zone to a regeneration zone to both of which reactants are continuously supplied, the movement of the mass being accomplished without interrupting the supply of reactants to the zones, thereby obtaining continuity of operations in both zones. Thus, in the copending application of Oliver F. Campbell, Serial No. 290,398, filed August 16, 1939, it is proposed to carry on the catalytic cracking of hydrocarbons in an apparatus in which the catalytic mass is rotated continuously and successively through a cracking zone and a regenerative zone separated from each other by purging zones in which material entrapped by the rotating mass is removed. Gaseous hydrocarbons to be cracked are fed continuously to the cracking zone from which the cracked product is continuously withdrawn. Hot oxidizing gas is fed continuously to the regenerative zone to burn "carbon" and the like which form on the catalyst and mask it, the resulting gaseous products of combustion being continuously withdrawn. Gases, such as superheated steam, are passed through the purging zones continuously and sweep out of the rotating catalyst (which preferably is in the form of a series of segments in an annulus) gaseous products entrapped by the catalyst in preceding zones.

In such apparatus, efficient and safe operations require that leakage between zones be minimized, and it is desirable to keep the fluids of each zone completely separate from each other, except as they may be entrapped in small quantity in the pores of the catalyst and thus transported from one zone to another.

As a result of our investigations, we have developed an apparatus in which a catalyst may be moved freely from one zone to another while the two are kept positively sealed from each other and operated continuously under different conditions. In accordance with our invention, we employ a movable carrier chamber within which the catalytic mass is enclosed, fluids being introduced into the chamber or removed therefrom or both (as the chamber passes through the several zones) by means of liquid seals disposed along the path of movement of the chamber. The seals are elongated horizontally disposed containers having a longitudinal baffle therein extending to below the level of liquid in the seal, i. e., to a point intermediate the top and bottom of the pool of liquid in the seal and a conduit projects under the baffle and thence upwardly to an open end immersed in the liquid. Gas being delivered to or from the chamber is forced to pass through the conduit under the baffle and thence through the liquid, and the carrier chamber is thus enabled to move continuously while it is sealed from its suroundings.

In the preferred form of our invention, the catalyst chamber is rotated on an upwardly extending axis in a circular path through the several zones, and the liquid seals are annular in form and disposed substantially horizontally. The container of the seal may be mounted on the catalyst chamber, in which case it rotates therewith and the conduit projecting into the seal is stationary; or the container may be stationary in which case the conduit is mounted on the chamber and rotates in the liquid of the seal. In either case, the container of the seal and the conduit are movable with respect to each other.

In short, our invention contemplates (in apparatus having a catalytic mass movable between zones or compartments within which different chemical conditions are maintained) the combination which comprises a carrier chamber movable along a fixed path and containing a catalytic mass, an elongated liquid seal disposed along said path and having an elongated container with a pool of liquid therein and a longitudinal baffle extending below the level of the pool, a conduit communicating with the chamber through the seal, said conduit projecting into the pool of liquid underneath said baffle and having an open end above the bottom of the baffle, and means for imparting relative longitudinal movement between the conduit and the container.

In its preferred form, our invention contemplates, in apparatus for rotating a catalytic mass successively through a series of zones sealed from each other, the combination which comprises a carrier chamber rotatably mounted on an upwardly extending axis and divided into segments by partitions extending outwardly from said axis, catalyst disposed in the segments, an annular liquid seal disposed substantially horizontally and coaxially with the carrier chamber, a pool of liquid in the seal extending above the lower edge of the baffles and a conduit for passing gas through the segments projecting into the seal and underneath the partitions. In its preferred aspect, the above-described apparatus has two annular liquid seals, through one of which gas is introduced into the segments and through the other of which gas is discharged. The inlet seal preferably has a stationary U-shaped inlet conduit dipping under the longitudinal baffle of the annular pan of the seal which is mounted on the carrier chamber and rotates therewith. The outlet seal is of reverse construction and has a series of U-shaped outlet conduits (one for each segment) which dip into a pool of liquid in a stationary annular pan disposed coaxially with the carrier chamber. In short, this second liquid seal is disposed horizontally about the upwardly extending axis and a gas outlet conduit fastened to a segment and communicating therewith projects into the annular liquid bath of the seal, and serves to convey gases underneath the baffle of the seal.

Preferably, a casing is disposed around the carrier chamber, the casing being divided into segments by barriers that extend upwardly and outwardly, and in such a structure the second liquid seal is disposed in the casing around the axis of the carrier chamber with the gas outlet conduit or conduits of the carrier chamber projecting into the liquid of this second seal. In this structure the barriers, which divide the casing into a plurality of compartments, projects below the level of the liquid in the second seal and the conduit (which is fixed to the carrier of the second chamber and rotates in the second liquid seal) is so disposed as to pass under the barriers of the casing.

Our invention will be more thoroughly understood in the light of the following detailed description taken in conjunction with the accompanying drawings in which:

Fig. 2 is a fragmentary sectional elevation taken through the apparatus of Fig. 1.

Figure 1:
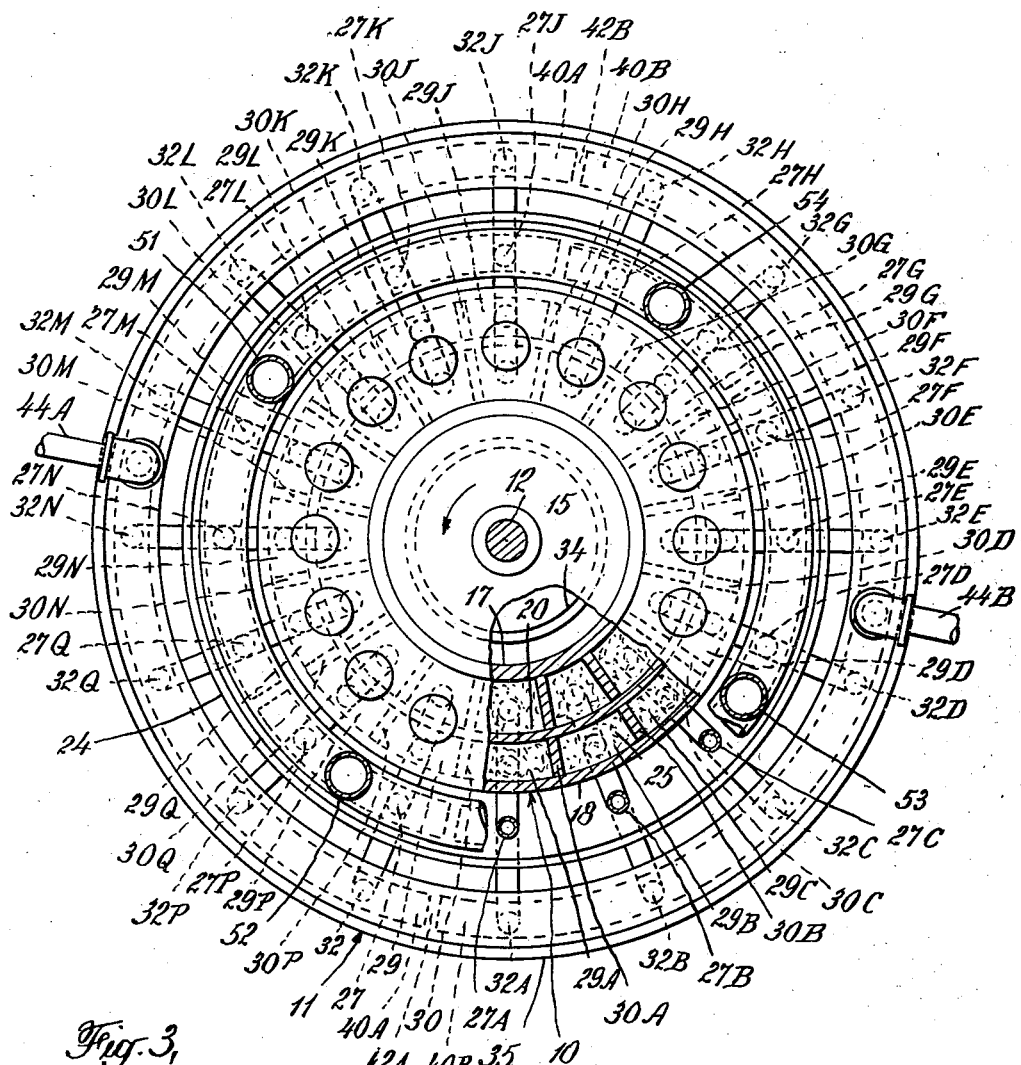
Fig. 1 is a plan, partly in section, of a rotary catalytic cracking apparatus embodying our invention.

Referring now to the drawings, it will be seen that the apparatus comprises a rotor assembly 10 and an annular casing 11. The rotor assembly is rigidly mounted on a shaft 12 that is upwardly extending and preferably substantially vertical. The shaft forms the axis of the apparatus and is supported in a thrust bearing 13. A pulley 14 is mounted rigidly on the lower end of the shaft and may be driven by a belt from a motor (not shown). The upper end of the shaft may be supported in a bearing (not shown) to give greater rigidity to the apparatus.

The rotor is fastened to the shaft at its upper end by means of a horizontally disposed circular disk 15 which is mounted concentrically on the shaft. The disk is welded or otherwise rigidly fastened to the upper end of an upright annular catalyst chamber 16. This chamber is formed of an inner tube 17 of circular cross section and an outer tube 18 likewise of circular cross section, the space between the tubes at their top being closed by means of an annular cover plate 19. A tubular baffle plate 20 is disposed vertically between the inner and outer tubes which form the walls of the catalyst chamber. The baffle tube extends to within a short distance of the cover plate 19 and is held in fixed relationship to the inner and outer tubes by means of an annular member 21 which closes the space between the baffle tube and the inner tube near the lower edge of the latter.

The outer tube is longer than the inner tube; the baffle tube, in turn, is longer than the outer tube and extends a considerable distance below it. Projecting outwardly and horizontally from the bottom of the baffle tube is an annular plate 22 which forms the bottom of the first or rotating liquid seal 23. The outer wall of this first annular liquid seal is formed by a second tube 24 which extends upwardly to the top of the apparatus from the outer edge of the plate 22, to which it is fastened.

A catalytic mass 25 of porous nature, for example, a mass of fuller's earth fills the catalyst chamber up to the cover plate and is supported on an annular foraminous support 26 that extends horizontally across the bottom of the catalyst chamber from a point slightly above the lower edge of the inner tube.

A conduit 27 extends downwardly from the top of the apparatus into the first liquid seal. The bottom of this conduit is bent into a U and the free end of the U extends under the outer tube of the catalyst carrier chamber (which forms the longitudinal baffle of the annular liquid seal) and upwardly for a short distance in the annular space inside this outer tube. Liquid, for example, a body 28 of molten lead is disposed in the liquid seal and rises above the bottom of the outer tube of the carrier chamber and also above the free end of the bent tube or conduit 27.

The carrier chamber is annular in form. It is divided into a plurality of segments or compartments 29, 29A, 29B, 29C, 29D, 29E, 29F, 29G, 29H, 29J, 29K, 29L, 29M, 29N, 29Q, 29P, by a plurality of radial partitions 30, 30A, 30B, 30C, 30D, 30E, 30F, 30G, 30H, 30J, 30K, 30L, 30M, 30N, 30Q, 30P. Each partition extends between the inner and outer tubes which form the side walls of the carrier chamber. The top of each partition abuts against the cover plate 19 to form a tight joint. The inner portion of each partition extends downwardly below the foraminous support 26 to the annular plate 21. The outer portion of each partition extends downwardly to a lower edge 31 which is just above the free end of the U-tube 27 in the seal, but below the level of liquid in the first seal. There is a clearance of about one-eighth of an inch between these partitions and the open end of the U-tube.

The bent tube 27 is only one of a plurality of such tubes, corresponding in number to the segments of the carrier chamber. Thus, there is a series of such tubes 27, 27A, 27B, 27C, 27D, 27E, 27F, 27G, 27H, 27J, 27K, 27L, 27M, 27N, 27Q, 27P, disposed around the apparatus and projecting into the first liquid seal underneath the baffle thereof with open ends adjacent the carrier chamber but below the barriers thereof and below the level of liquid in the seal.

Each segment of the carrier compartment is provided with an outlet conduit. These outlet conduits 32, 32A, 32B, 32C, 32D, 32E, 32F, 32G, 32H, 32J, 32K, 32L, 32M, 32N, 32Q, 32P, are U-tubes fastened into their respective segments at the plate 21 between the inner tube and the baffle tube of the carrier compartment. These outlet conduits extend downwardly and underneath the first liquid seal and thence curve upwardly a short distance to open ends.

The rotor of the apparatus is enclosed in the annular casing 11. The bottom of this casing is formed by an annular plate 33 disposed horizontally below the series of outlet conduits. The inner wall of the casing is formed by a tube 34 that is welded at its bottom to the bottom plate 33 and extends vertically inside the rotor assembly to a point just below the disk 15. Likewise, the outer wall of the casing is formed by an outer tube 35 that is welded to the outer edge of the plate 33 and extends upwardly to a point near the top of the apparatus, the tops of the inner and outer tubes being level with each other, as shown in Fig. 2.

The bottom of the annular casing is filled with liquid such, for example, as molten lead to form a pool 36. The pool extends above the bottom plate 22 of the first liquid seal and forms a second liquid seal 37 within which the outlet conduits rotate. The level of the liquid in the second seal is above the outer ends of the outlet conduits, thereby sealing them. The longitudinal or annular baffle of the second seal is the container of the first seal.

In the apparatus illustrated, there are four inlet manifolds 51, 52, 53, 54, disposed, respectively, adjacent the cracking zone, the first purging zone, the regenerative zone and the second purging zone. Thus, the manifold 51 of the cracking zone is connected to a large proportion, say three-eighths of the gas inlet pipes 27J, 27K, 27L, 27M, 27N, 27Q, all of which deliver gaseous hydrocarbons to be cracked to rotating segments of the catalyst carrier. Superheated steam or other purging gas is supplied by the manifold 52 in the first purging zone to a relatively smaller number of inlet conduits, say two (27P, 27), and this steam, likewise, is forced through the first liquid seal into the rotating segments. In the regenerative zone, the manifold 53 supplies hot air or other oxidizing medium to the remainder of the inlet conduits, except for two (27G, 27H) that are fed with superheated steam from the manifold 54 in the second purging zone.

All of the inlet conduits are the same structurally and all are "hooked" under the outer tube of the carrier compartment, as described hereinbefore, terminating in open ends slightly below the level of the liquid in the seal and below the radial barriers which divide the carrier compartment into segments.

The outlet conduits, as they rotate, discharge into an annular compartment 40 which has an open lower end 41 into which the free ends of the outlet conduits project. In the apparatus illustrated, this outlet collector compartment 40 is divided into two parts 40A, 40B, by transverse radial barriers 42A, 42B. The compartment is closed at the top by a plate 43 and its two parts communicate, respectively, with a pipe 44A (through which the cracked products and purging steam are discharged) and a pipe 44B from which excess oxidizing gas, gaseous products of combustion, and purging steam is exhausted.

The operation of the apparatus just described is as follows: The rotor is turned at a speed ranging from about 1 to $\frac{1}{10}$ R. P. M., so that the various segments of the catalyst chamber (all of which are full of catalyst above the foraminous plate) are rotated in an orbit. Hydrocarbons to be cracked are fed in a gaseous condition and at suitable temperature and pressure into the apparatus through the manifold 51. The gaseous hydrocarbons are forced out of the end of the inlet conduits in the cracking zone and bubble through the liquid of the first liquid seal, say, molten lead and pass upwardly through the successive segments, as these are rotated through the zone. The hydrocarbons then pass downwardly through the respective segments and cut through the respective outlet conduits, being forced upwardly through the metal of the second liquid seal into the outlet collector compartment 40A. In passing through the catalytic mass of each segment the hydrocarbons are cracked.

As shown in Fig. 1, the apparatus rotates counterclockwise and each segment of the catalyst carrier after passing through the cracking zone (i. e., the region at which hydrocarbons pass through the apparatus) enters a first purging zone into which steam is fed through the manifold 52. The passage of steam through the respective segments of the carrier chamber is the same as described for oil hereinbefore. In short, steam is forced out of the end of the inlet conduits of the zone upwardly between the outer tube and the baffle tube in successive segments of the carrier chamber, thence downwardly through the balance of the respective segments and out through the respective discharge conduits. In the apparatus illustrated, no attempt is made to segregate the output of the cracking zone and the first purging zone, both being collected together in the outlet collector chamber 40A and withdrawn through the pipe 44A. However, if desired, additional barriers may be placed in the outlet collector chamber so that the exhaust steam may be collected in large part separately from the cracked hydrocarbon vapor.

Next around the periphery of the apparatus is the manifold 53 through which hot oxidizing gas, for example, hot air is fed into the several segments of the carrier chamber as these rotate. The hot air follows a path similar to that of the hydrocarbon vapors and the purging steam and is discharged through the respective outlet conduits.

Next around the periphery of the apparatus is the second purging zone into which steam is fed through the manifold 54. The steam, likewise, passes through the rotating catalyst segments as these come into juxtaposition with the inlet conduits of the second purging zone. This steam serves to purge from the catalyst segments the entrapped excess oxidizing gases and gaseous products of combustion formed by the hot air in the regenerative zone of the apparatus. In the apparatus illustrated, no attempt is made to segregate the steam of the second purging zone from the output of the regenerative section, the gases from the two sections being collected together in the compartment 40B and discharged through the pipe 44B.

From the foregoing, it will be apparent that the apparatus of our invention permits a catalyst to be passed successively through a series of zones in which very different conditions obtain without any opportunity for leakage from one zone to the other. All zones are sealed from each other effectively and positively by the two liquid seals.

Figure 3:
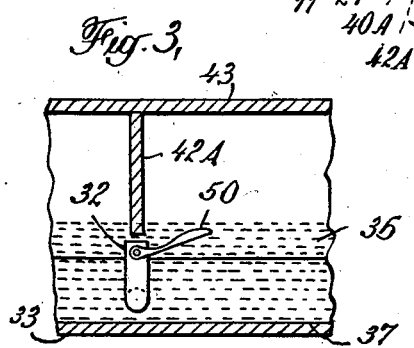
Fig. 3 is a detail drawing illustrating certain "flappers" employed in the ends of the outlet conduits of the apparatus of Figs. 1 and 2.

Any liquid which has a boiling point below that prevailing in the particular catalytic process may be employed. However, in the catalytic cracking of hydrocarbons the cracking temperature is high, say, in the neighborhood of 1000° F. For this reason, it is necessary to employ a molten metal or salt. Various molten metals and salts and salt mixtures may be used, but from a commercial standpoint molten lead is probably the most satisfactory to employ in catalytic cracking operations. The hot air passing through the molten lead, however, tends to oxidize it with the result that oxide tends to form in the metal, and sometimes as a scum on its surface. This causes no difficulty in the first seal which rotates with the apparatus so that the metal is periodically subjected to reducing conditions in the cracking zone and to oxidizing conditions in the regenerative zone. This intermittent subjection of the molten lead or other metal to oxidizing conditions and reducing conditions tends to prevent the formation of an excessive quantity of oxide, for the oxide which is formed in the regenerative zone tends to be reduced to molten lead in the cracking zone. However, the molten lead in the second liquid seal tends to remain stationary except as it may be impelled by the outlet conduits rotating in it. There is a tendency for oxide to collect on the surface of the molten lead in the second seal adjacent the point at which the outlet conduits discharge in the regenerative zone. Serious and objectionable accumulation of lead oxide at this point, however, may be avoided by employing a series of flappers or floats 50 on the discharge end of the outlet conduits. These flappers may be made of metal having a specific gravity lighter than lead and hinged to the outlet conduits, as shown in Fig. 3. They tend to float near the top of the lead in the bath and by their action propel the lead oxide under the barriers 42A, 42B, so that the lead oxide is moved gradually from the regenerative zone to the cracking zone and is given an opportunity to be reduced.

The particular temperature and pressure conditions prevailing in the various sections of the apparatus of our invention as applied to catalytic cracking are essentially no different than those described in the aforementioned application of Oliver F. Campbell. They will vary depending upon the stock undergoing cracking and upon other conditions. However, the seals provided in our apparatus present outstanding advantages in rotary mechanisms for catalytic cracking and the like, for in such apparatus there is a tendency for admixture of oxidizing gases with the hydrocarbons. Thus, explosive mixtures may be formed which present an extreme industrial hazard unless, as in our apparatus, a positive seal between the several zones is assured.

As indicated hereinbefore, however, the apparatus of our invention is not limited to application in catalytic cracking but may be employed in any catalytic operation in which the catalyst periodically should be regenerated or otherwise treated.

We claim:

1. In apparatus for rotating a catalyst successively through a series of zones sealed from each other, the combination which comprises a carrier chamber rotatably mounted on an upwardly extending axis and divided into segments by outwardly extending partitions, catalysts disposed in the segments, an annular liquid seal disposed substantially horizontally and fixed to the periphery of the carrier chamber, a pool of liquid in the seal extending above the lower edges of the partitions, a conduit for introducing gas into the segments projecting into the seal below the partitions from a point outside the chamber, and means for exhausting gas from the segments.

2. In apparatus for rotating a catalyst successively through a series of zones sealed from each other, the combination which comprises a carrier chamber rotatably mounted on an upwardly extending axis and divided into segments by outwardly extending partitions, catalyst disposed in the segments, an annular liquid seal disposed substantially horizontally and fixed to the periphery of the carrier chamber, a pool of liquid in the seal extending above the lower edges of the partitions, a conduit for introducing gas into the segments projecting into the seal below the partitions from a point outside the chamber, a second liquid seal disposed horizontally about the axis and a gas outlet conduit fastened to a segment and projecting into the second liquid seal, said gas outlet conduit communicating with the segment.

3. In apparatus for rotating a catalyst successively through a series of zones sealed from each other, the combination which comprises a carrier chamber rotatably mounted on an upwardly extending axis and divided into segments by outwardly extending partitions, catalyst disposed in the segments, an annular liquid seal disposed substantially horizontally and fixed to the periphery of the carrier chamber, a pool of liquid in the seal extending above the lower edges of the partitions, a conduit for introducing gas into the segments projecting into the seal below the partitions from a point outside the chamber, a casing disposed around the carrier chamber, a second annular liquid seal disposed in the casing around the axis of the carrier chamber, and a gas outlet conduit connected to a segment of the chamber and projecting into the liquid of the second seal.

4. In apparatus for rotating a catalyst successively through a series of zones sealed from each other, the combination which comprises a carrier chamber rotatably mounted on an upwardly extending axis and divided into segments by outwardly extending partitions, catalyst disposed in the segments, an annular liquid seal disposed substantially horizontally and fixed to the periphery of the carrier chamber, a pool of liquid in the seal extending above the lower edges of the partitions, a conduit for introducing gas into the segments projecting into the seal below the partitions from a point outside the chamber, a casing disposed around the carrier chamber, a second liquid seal disposed in the casing around the carrier chamber, barriers dividing the casing into a plurality of compartments and projecting below the level of the liquid in the second seal, and a conduit fixed to and communicating with a segment of the carrier chamber and projecting through the second liquid seal to a point below the barriers of the casing.

5. In apparatus having a catalytic mass movable between zones in which different chemical conditions are maintained, the combination which comprises a carrier chamber mounted to move along a fixed path between said zones, a liquid seal comprising an elongated container with a pool of liquid therein mounted on the carrier chamber and having a baffle therein extending longitudinally of the path and with its lower edge intermediate the top and bottom of the pool in the seal, and a conduit projecting downwardly into said liquid seal and underneath the baffle for introducing vapor through the liquid seal, the baffle being in a substantially fixed relationship to the carrier chamber and directing gas introduced through the liquid seal into the carrier chamber, the carrier chamber being movable relative to the conduit.

6. In apparatus having a catalytic mass movable between zones within which different chemical conditions are maintained, the combination which comprises a carrier chamber movable along a fixed path between said zones and containing a catalytic mass, an elongated liquid seal disposed along said path and having an elongated container with a pool of liquid therein and a longitudinal baffle extending in the direction of the path with its lower edge intermediate the top and bottom of the pool, a conduit communicating with the chamber through the seal, said conduit projecting into the pool of liquid and underneath said baffle and having an open end above the lower edge of the baffle for introducing gas through the liquid seal, the baffle being in a substantially fixed relationship to the carrier chamber and directing gas leaving the open end of the conduit into the carrier chamber, and means for imparting relative longitudinal movement between the conduit and the container.

7. In apparatus having a catalytic mass movable between zones within which different chemical conditions are maintained, the combination which comprises a carrier chamber movable along a fixed path between the zones and containing a catalytic mass, an elongated liquid seal disposed along said path and having an elongated container with a pool a liquid therein and a longitudinal baffle extending along said path with its lower edge intermediate the top and bottom of the pool, said container being fastened to the carrier chamber and movable therewith, a conduit communicating with the chamber through the seal, said conduit projecting into the pool of liquid underneath said baffle from a point outside the chamber and having an open end above the bottom of the baffle adjacent the chamber for introducing gas through the liquid seal, the baffle being in a substantially fixed relationship to the carrier chamber and directing gas leaving the open end of the conduit into the carrier chamber, and means for imparting relative longitudinal movement between the conduit and the carrier chamber.

8. In apparatus having a catalytic mass movable between zones within which different chemical conditions are maintained, the combination which comprises a carrier chamber movable along a fixed path between zones and containing a catalytic mass, an elongated liquid seal disposed along said path comprising an elongated container with a pool of liquid therein and a longitudinal baffle carried by the carrier chamber and extending in the direction of the path with its lower edge intermediate the top and bottom of the pool, the carrier chamber being movable with respect to the liquid seal, a conduit attached to the chamber and communicating therewith, said conduit projecting into the pool of liquid and underneath said longitudinal baffle and having an open end above the bottom of the baffle on the side opposite the carrier chamber, and means for imparting relative longitudinal movement between the conduit and the container.

9. In apparatus having a catalytic mass movable between zones within which different chemical conditions are maintained, the combination which comprises a carrier chamber movable along a fixed path and containing a catalytic mass, an elongated liquid seal disposed along said path and having an elongated container with a pool of molten metal therein and a longitudinal baffle carried by the carrier chamber and extending in the direction of the path with its lower edge intermediate the top and bottom of the pool, a transverse barrier extending across the elongated liquid seal and extending below the level of the pool, a conduit fastened to and communicating with the carrier chamber, said conduit projecting into the pool and underneath the longitudinal baffle and having an open end below the transverse barrier, a float hinged to the open end of said conduit, and means for imparting relative longitudinal movement between the conduit and the container.

10. In apparatus for rotating a catalytic mass successively through a series of zones sealed from each other, the combination which comprises a carrier chamber rotatably mounted on an upwardly extending axis and divided into segments by partitions extending outwardly from said axis, catalyst disposed in the segments, an annular liquid seal disposed substantially horizontally and coaxially with the carrier chamber, a pool of liquid in the seal extending above the lower edge of the partitions, and a conduit projecting through the liquid seal and having an open end below the partitions for introducing gas through the liquid seal into the segments.

11. In apparatus for rotating a catalytic mass successively through a series of zones sealed from each other, the combination which comprises a carrier chamber rotatably mounted on an upwardly extending axis and divided into segments by outwardly extending partitions, catalyst disposed in the segments, an annular liquid seal for introducing gas into the segments, said annular liquid seal being fastened to the periphery of the carrier chamber and provided with a pool of liquid and an annular baffle having its lower edge intermediate the top and bottom of the pool, a stationary U-shaped conduit dipping under the baffle of said seal and having an open end adjacent the carrier chamber for introducing gas through the liquid seal, the baffle being in a substantially fixed relationship to the carrier chamber and directing gas leaving the open end of the conduit into the carrier chamber, a second annular liquid seal for removing gas from the carrier chamber, said second seal comprising a stationary annular pan disposed coaxially with the carrier chamber and having a second pool of liquid therein extending above another annular baffle, the lower edge of which is intermediate the top and bottom of the second pool and a U-shaped conduit fastened to the carrier chamber and extending into the second liquid seal and underneath the annular baffle thereof.

12. In apparatus for rotating a catalytic mass successively through a series of zones sealed from each other, the combination which comprises a carrier chamber rotatably mounted on an upwardly extending axis and divided into segments by partitions extending outwardly from said axis, catalyst disposed in the segments, a first annular liquid seal disposed substantially horizontally and coaxialy with the carrier chamber and mounted on the periphery thereof, an annular baffle in said first seal, a pool of liquid in the first seal extending above and below the lower edge of the baffle and a conduit for passing gas into the segments projecting through the seal and having an open end adjacent the partitions of the carrier chamber, said annular baffle being attached to the carrier chamber and directing gas leaving the open end of the conduit into the segments, a second annular liquid seal comprising a stationary pan disposed coaxially with the carrier chamber, a second annular baffle in a substantially fixed relationship to the pan of the second annular liquid seal, and a pool of liquid extending above and below the lower edge of said baffle, a plurality of outlet conduits communicating with the respective segments of the carrier chamber, said outlet conduits projecting into the pool of liquid of the second annular liquid seal and passing under the second annular baffle.

HARRY L. PELZER.
WILLIS S. GULLETTE.